Patented June 11, 1935

2,004,781

UNITED STATES PATENT OFFICE 2,004,781

INSULATING COMPOSITION FOR IMPREGNATING ELECTRICAL TAPE

Frank M. Clark and Ralph A. Ruscetta, Pittsfield, Mass., assignors to General Electric Company, a corporation of New York No Drawing. Application September 18, 1930, Serial No. 482,905

7 Claims. (Cl. 106—17)

The present invention relates broadly to electrical insulation. More specifically this invention is concerned with a new and improved tape adapted for use in electrical apparatus, a process for preparing the same, and the composition employed in the manufacture of said tape.

Friction tape is employed in electrical apparatus, as for example, in motor armatures. Ordinary tape heretofore employed has been disadvantageous, especially in connection with motor armature application, in that it prevented the proper curing of the insulating varnish applied to the coils after the tape was applied. This has probably been due to the fact that ordinary friction tapes contain rubber compounds therein which prevent the solvent in the varnish from escaping when the coil is baked. It is, of course, obvious that such solvent must be entirely eliminated and the varnish properly cured before the coil is satisfactory.

We have discovered that we can produce a friction tape adapted for use wherever such a tape is now used and where subsequent to the application of said tape a varnish is applied and baking operations carried out. The friction tape of our invention can be manufactured not only at a cheaper cost than present tapes but is of such a nature that it eliminates the objectionable features mentioned above and permits the proper curing and satisfactory production of apparatus in which it is used.

In order that our invention may be more fully understood the following detailed description thereof is given and its scope pointed out in the appended claims.

In manufacturing the tape a novel composition is employed which imparts the desirable characteristics to the tape. We employ a treating composition for producing such tape, composed of a high melting wax such as Montan wax; colophony (rosin) or derivatives thereof, such as ester gum; and a non-drying, fatty oil, such as castor oil. While the proportions of the ingredients in the composition may be varied considerably, a typical composition for use contains substantially

| | Per cent by weight |
|---|---|
| Montan wax | 40 |
| Rosin | 32 |
| Castor oil | 28 |

The Montan wax is melted and the temperature brought up to about 150° C. The function of the wax is to obtain a relatively high melting point. The rosin is then carefully added and the temperature maintained at about 150° C. for about 35 minutes. The rosin is used largely to maintain viscosity value. At the end of this time the castor oil is added, this ingredient being employed in order to promote plasticity and to act as a flux for the rosin and the mineral wax or other wax employed. The temperature of the mass is maintained not higher than 150° C., and the mixture is kept well stirred and is heated for about 1¼ hours. The characteristics of this particular compound are as follows:

| | |
|---|---|
| Viscosity | 70 centipoise at 100° C. measured with the MacMichael viscosimeter |
| Flash | 243° C. |
| Burn | 278° C. |
| Flow point approximately | 60° C. |

The tape which is treated with this material can be any of the commercial types of fibrous material employed as tape. The width may be of any convenient dimension depending on the use to which the tape is put. In treating the tape the composition obtained as described above is heated in air to a temperature of about 165° C. The tape in any convenient form, for example as rolls, is immersed in the composition and the temperature maintained at about 165° C. for about two hours. Care must be taken to see that the tape is entirely immersed in the treating composition during this time. At the end of this treatment the tape is removed from the composition, allowed to drain and cool to room temperature. The rolls of tape may then be wrapped and stored for use.

While in the specific example given Montan wax was employed as the high melting wax, it is to be understood that the invention is not limited thereto. Other high melting waxes such as carnauba wax, ozokerite and the like may be employed. Also as pointed out, derivatives of abietic acid or colophony, such as ester gum and the like may be used. Such products, of course, contain the abietic acid radical. It is of course understood that castor oil is merely typical of any non-drying oil which may be employed.

The proportions of the various ingredients employed may be varied considerably. The particular mixture cited in the example has been found desirable since it gives the degree of tackiness desired in the tape without sacrifice in other desirable characteristics. As illustrative of the fact that the proportions of the ingredients entering into the treating composition may be varied we cite the following composition which may also be successfully employed:

|  | Percent |
|---|---|
| Montan wax | 50 |
| Rosin | 40 |
| Castor oil | 10 |

In this example, as well as in the first example, the proportion of Montan wax preponderates over each of the other ingredients.

While the specific example illustrating the treatment of the rolls in the treating composition calls for a temperature of about 165° C. this temperature is not fixed but may be varied depending on the time taken in the treating operations. For example, a temperature of about 150° C. may be employed when the tape is immersed in the composition, the time of treatment being lengthened correspondingly. Where the tape rolls are kept immersed at about 165° C. for about two hours, at about 150° C. the time would be increased to about two to four hours.

What we claim as new and desire to secure by Letters Patent of the United States, is:—

1. A composition of matter containing a high melting wax in an amount about 40 to 50 per cent by weight and also containing substantial amounts both of rosin and non-drying fatty oil to produce an adhesive material suitable for use in insulating friction tape.

2. An insulating composition which consists of a preponderant amount of Montan wax, and substantial amounts of rosin, and castor oil to produce a tacky material having a flow point of approximately 60° C.

3. A composition for treating fibrous material to form an electrical tape which consists of substantially 40% by weight of Montan wax, 32% by weight of rosin, and 28% by weight of castor oil.

4. A composition having a flow point of about 60° C. comprising a mixture by weight of about 40 to 50 per cent of Montan wax, about 32 to 40 per cent of rosin, and about 28 to 10 per cent of castor oil.

5. A composition of matter containing a high melting wax in an amount at least about 40 per cent by weight and also containing sufficient amounts both of rosin and castor oil to produce a tacky, solid material suitable for use in insulating friction tape.

6. A composition of matter suitable for electrical insulating use comprising a mixture by weight of about 40 to 50 per cent of high melting wax, about 32 to 40 per cent of a material containing abietic acid radical, and about 28 to 10 per cent of castor oil.

7. A composition of matter suitable for electric insulating use consisting of a mixture by weight of about 40 to 50 per cent of a member of the class consisting of Montan wax, carnauba wax and ozokerite, about 32 to 40 per cent of rosin and about 28 to 10 per cent of castor oil.

FRANK M. CLARK.
RALPH A. RUSCETTA.